US012033561B2

(12) United States Patent
Li

(10) Patent No.: US 12,033,561 B2
(45) Date of Patent: Jul. 9, 2024

(54) DISPLAY PANEL AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Jihui Li, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 43 days.

(21) Appl. No.: 17/780,993

(22) PCT Filed: May 16, 2022

(86) PCT No.: PCT/CN2022/093080
§ 371 (c)(1),
(2) Date: May 29, 2022

(87) PCT Pub. No.: WO2023/201804
PCT Pub. Date: Oct. 26, 2023

(65) Prior Publication Data

US 2023/0335038 A1 Oct. 19, 2023

(30) Foreign Application Priority Data

Apr. 19, 2022 (CN) ......................... 202210409651.0

(51) Int. Cl.
*G09G 3/20* (2006.01)
*G09G 3/00* (2006.01)

(52) U.S. Cl.
CPC ........... *G09G 3/2096* (2013.01); *G09G 3/006* (2013.01); *G09G 2310/08* (2013.01); *G09G 2330/08* (2013.01)

(58) Field of Classification Search
CPC .. G09G 3/2096; G09G 3/006; G09G 2310/08; G09G 2330/08; G09G 2300/0426; G09G 2330/12
See application file for complete search history.

(56) References Cited

U.S. PATENT DOCUMENTS 6,064,222 A * 5/2000 Morita .................. G09G 3/006 324/73.1
2011/0074664 A1 * 3/2011 Lebrun ................. G09G 3/006 345/98

(Continued)

FOREIGN PATENT DOCUMENTS

CN 110232888 A 9/2019
CN 111048022 A 4/2020

(Continued)

OTHER PUBLICATIONS

PCT International Search Report for International Application No. PCT/CN2022/093080, dated Dec. 27, 2022, 10pp.

(Continued)

*Primary Examiner* — Grant Sitta
(74) *Attorney, Agent, or Firm* — The Roy Gross Law Firm, LLC; Roy Gross

(57) ABSTRACT

A display panel and a display device are disclosed in the present application. The display panel includes a driving chip set, a pad set, and a cell test circuit, which can determine a binding state between each pin and a corresponding pad according to timing and states of binding detection signals output in correspondence with a first binding detection line and a second binding detection line, improving detection accuracy of the binding state; compared (Continued)

with relying on a microscope to check the binding state of each pin one by one, detection efficiency of the binding state is improved.

20 Claims, 3 Drawing Sheets

(56) References Cited

U.S. PATENT DOCUMENTS

| | | | | |
|---|---|---|---|---|
| 2012/0235964 | A1 | 9/2012 | Kim et al. | |
| 2019/0311663 | A1* | 10/2019 | Zhao | G09G 3/006 |

FOREIGN PATENT DOCUMENTS

| | | | |
|---|---|---|---|
| CN | 111627367 | A | 9/2020 |
| CN | 111864108 | A | 10/2020 |
| CN | 113284443 | A | 8/2021 |

OTHER PUBLICATIONS

PCT Written Opinion of the International Search Authority for International Application No. PCT/CN2022/093080, dated Dec. 27, 2022, 7pp.

* cited by examiner

DISPLAY PANEL AND DISPLAY DEVICE

CROSS REFERENCE TO RELATED APPLICATIONS

This application is a National Phase of PCT Patent Application No. PCT/CN2022/093080 having International filing date of May 16, 2022, which claims the benefit of priority of CN application No. 202210409651.0, filed Apr. 19, 2022, the contents of which are all incorporated herein by reference in their entirety.

FIELD OF DISCLOSURE

The present application relates to a technical field of displays, and specifically to a display panel and a display device.

BACKGROUND OF DISCLOSURE

In a production process of display panels, it is usually necessary to bind pins of driving chips to corresponding pads, however, binding results of the pins of the driving chips and the corresponding pads are prone to defects, which will affect normal operation of the display panels.

Therefore, a method of detecting bad binding was created. One of them is to reserve binding test points on only two pins on two sides of the driving chip; this method cannot actually detect or identify binding results of other pins, and detection accuracy of binding is poor. Another is to rely on a microscope to check binding results of these pins one by one, and detection efficiency of this method is very low.

Technical Problem

The present application provides a display panel and a display device to alleviate technical problems of poor accuracy and low efficiency in detection of binding state of each pin.

SUMMARY OF DISCLOSURE

In a first aspect, a display panel is provided by the present application, the display panel comprises a driving chip set, the driving chip set comprises N pins used to transmit corresponding driving signals, N is a positive integer; a pad set, the pad set comprises N pads, one of the pads is bound in correspondence with one of the pins; and a cell test circuit, each input end of the cell test circuit is connected corresponding to one of the pads respectively, a first controlling end of the cell test circuit is connected to a first controlling line, a second controlling end of the cell test circuit is connected to a second controlling line, a first output end of the cell test circuit is connected to a first binding detection line, a second output end of the cell test circuit is connected to a second binding detection line, a binding state between each pin and a corresponding pad is determined according to timing and states of binding detection signals output in correspondence with the first binding detection line and the second binding detection line.

In some embodiments, the N pins are sequentially arranged along a first direction, and the corresponding driving signals are sequentially transmitted along the first direction in a time-division manner by the N pins; the N pads are sequentially arranged along the first direction, wherein a first pad to an Nth pad are bound in correspondence with a first pin to an Nth pin in sequence; the cell test circuit comprises N switching devices arranged along the first direction in sequence, the N switching devices are divided into odd-group switching devices and even-group switching devices, wherein an input end of a first switching device to an input end of an Nth switching device are connected corresponding to the first pad to the Nth pad in sequence, respectively; each controlling end of the odd-group switching devices is connected to one of the first controlling line or the second controlling line, each controlling end of the even-group switching devices is connected to another of the first controlling line or the second controlling line; each output end of the odd-group switching devices is connected to one of the first binding detection line or the second binding detection line, each output end of the even-group switching devices is connected to another of the first binding detection line or the second binding detection line; and the odd-group switching devices and the even-group switching devices are turned on alternately in a time-division manner.

In some embodiments, a position of a corresponding pin is determined according to a timing comparison result of each the driving signal to each binding detection signal; a binding state between the corresponding pin and a corresponding pad is determined according to a state comparison result and/or the timing comparison result of each driving signal and each binding detection signal.

In some embodiments, a pulse of an Nth driving signal and a pulse of an Nth binding detection signal are in a same time period, and then a pin corresponding to the Nth binding detection signal is determined to be the Nth pin.

In some embodiments, the binding state comprises a normal binding state, and in response to timing and pulse amplitude of each driving signal being consistent with timing and pulse amplitude of each binding detection signal, then the binding state between the corresponding pin and the corresponding pad is determined to be the normal binding state.

In some embodiments, the binding state further comprises a bad binding state, and in response to pulse amplitude of each binding detection signal being less than pulse amplitude of a corresponding driving signal, then the pin corresponding to the binding detection signal is determined to be in the bad binding state.

In some embodiments, the binding state further comprises a short-circuit binding state, the binding detection signal comprises a first binding detection signal transmitted by the first binding detection line and a second binding detection signal transmitted by the second binding detection line, in response to pulse duration of the first binding detection signal overlapping in timing with pulse duration of the second binding detection signal, then at least two adjacent corresponding pins are determined to be in the short-circuit binding state.

In some embodiments, the binding state further comprises an unbound state, in response to a number of pulses of the binding detection signal being less than a number of pulses of each driving signal, then the corresponding pin is determined to be in the unbound state.

In some embodiments, in response to the display panel being in a display state, the switching devices of the cell test circuit are in an off state.

In a second aspect, a display device is provided by the present application. The display device comprises the display panel in one above-mentioned embodiment at least, wherein the driving chip set, the pad set, and the cell test circuit are arranged along a second direction.

The display panel and the display device provided by the present application, through one pad being bound in correspondence with one pin, each input end of the cell test circuit is connected corresponding to one of the pads respectively, a first controlling end of the cell test circuit is connected to a first controlling line, a second controlling end of the cell test circuit is connected to a second controlling line, a first output end of the cell test circuit is connected to a first binding detection line, a second output end of the cell test circuit is connected to a second binding detection line, and the cell test circuit is used to determined a binding state between each pin and a corresponding pad according to timing and states of binding detection signals output in correspondence with the first binding detection line and the second binding detection line, and which not only can detect the binding state of each pin, but also improve detection accuracy of the binding state; and the binding state between each pin and the corresponding pad can be determined according to timing and states of the binding detection signals; compared with relying on a microscope to check a binding state of each pin one by one, detection efficiency of binding state is improved.

In addition, the display panel in related art usually uses a cell test circuit for lighting test. The present application can endow the cell test circuit with a new purpose or function, which not only saves circuit usage of the display panel, but also implements more advanced detection of the binding state.

DETAILED DESCRIPTION OF PREFERRED EMBODIMENTS

In order to make objectives, technical solutions and effects of the present application clearer and clearer, the present application will be further described in detail below with reference to accompanying drawings and examples. It should be understood that specific embodiments described here are only used to explain the present application, but not to limit the present application.

Figure 1:
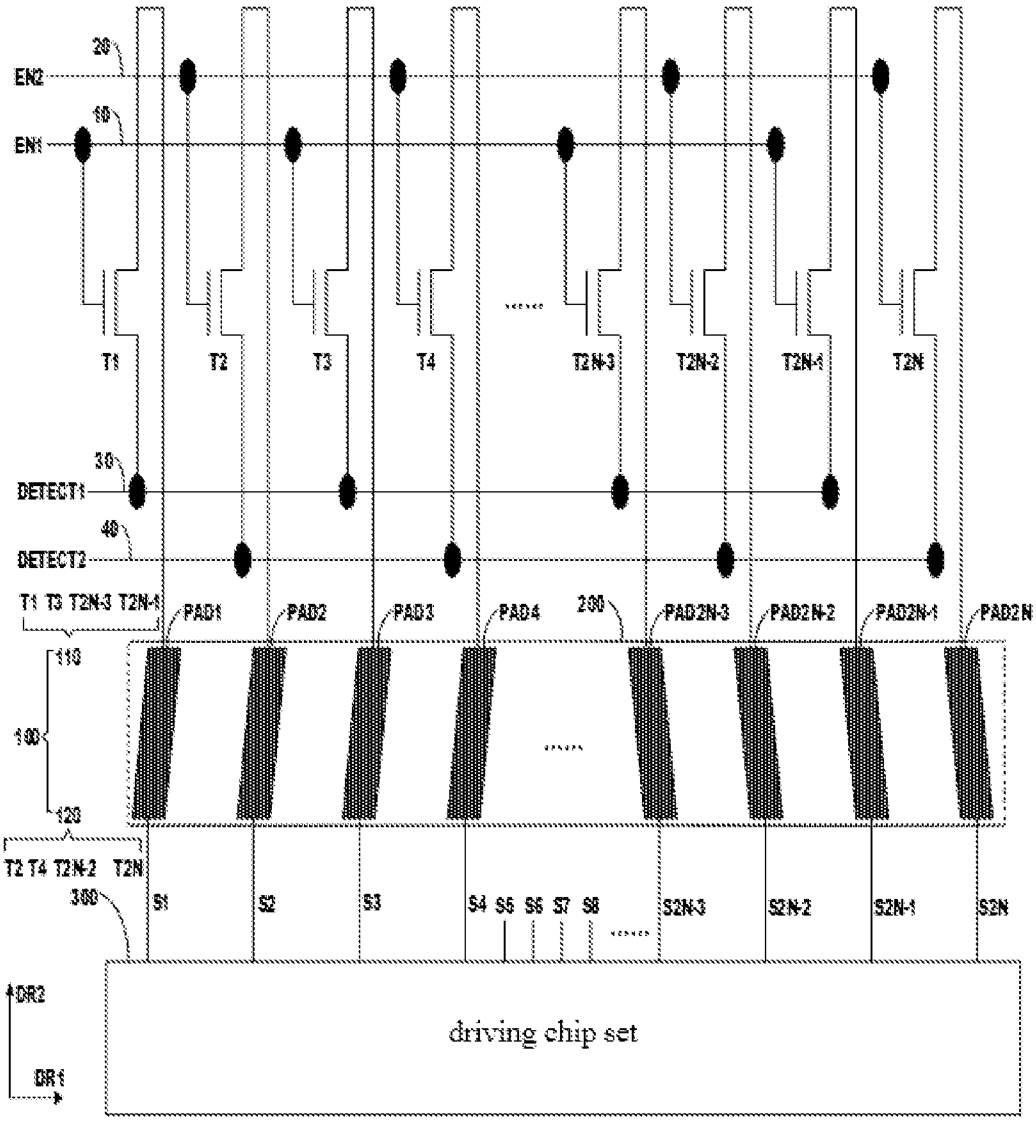
FIG. 1 is a schematic structural diagram of a display panel provided by an embodiment of the present application.

In view of technical problems of poor accuracy and low efficiency in the above-mentioned detection of the binding state of each pin, the present embodiment provides a display panel. Please refer to FIGS. 1 to 7, as shown in FIG. 1, the display panel includes a driving chip set 300, a pad set 200, and a cell test circuit 100. The driving chip set 300 comprises N pins used to transmit corresponding driving signals, and N is a positive integer. The pad set 200 comprises N pads, one of the pads is bound in correspondence with one of the pins. Each input end of the cell test circuit 100 is connected corresponding to one of the pads respectively; a first controlling end of the cell test circuit 100 is connected to a first controlling line 10; a second controlling end of the cell test circuit 100 is connected to a second controlling line 20; a first output end of the cell test circuit 100 is connected to a first binding detection line 30; a second output end of the cell test circuit 100 is connected to a second binding detection line 40. The cell test circuit 100 is used to determine a binding state between each pin and a corresponding pad according to timing and states of binding detection signals output in correspondence with the first binding detection line 30 and the second binding detection line 40.

It can be understood that the display panel provided by the embodiment, through one of the pads being bound in correspondence with one of the pins, each input end of the cell test circuit 100 is connected corresponding to one of the pads, respectively. The first controlling end of the cell test circuit 100 is connected to the first controlling line 10; the second controlling end of the cell test circuit 100 is connected to the second controlling line 20; the first output end of the cell test circuit 100 is connected to the first binding detection line 30; the second output end of the cell test circuit 100 is connected to the second binding detection line 40. The cell test circuit 100 can determine the binding state between each pin and the corresponding pad according to the timing and states of binding detection signals output in correspondence with the first binding detection line 30 and the second binding detection line 40, which not only can detect the binding state of each pin, but also improve detection accuracy of the binding state; and the binding state between each pin and the corresponding pad can be determined according to the timing and states of the binding detection signals, compared with relying on a microscope to check a binding state of each pin one by one, detection efficiency of binding state is improved.

In addition, the display panel in related art usually uses the cell test circuit 100 for lighting test. The present application can endow the cell test circuit 100 with a new purpose or function, which not only saves circuit usage of the display panel, but also implements more advanced detection of the binding state.

It should be noted that the driving chip set 300 may include at least one driving chip, and the N pins of the driving chip set 300 can all be output pins of the at least one driving chip, each output pin is used to transmit a corresponding driving signal.

In one embodiment, the N pins are arranged along a first direction DR1, and the corresponding driving signals are sequentially transmitted in a time-division manner along the first direction DR1 by the N pins. The N pads are sequentially arranged along the first direction DR1, wherein a first pad PAD1 to an Nth pad are bound in correspondence with a first pin S1 to an Nth pin in sequence. The cell test circuit 100 comprises N switching devices arranged along the first direction DR1 in sequence; the N switching devices are divided into odd-group switching devices 110 and even-group switching devices 120, wherein an input end of a first switching device to an input end of an Nth switching device are connected corresponding to the first pad to the Nth pad in sequence, respectively. Each controlling end of the odd-group switching devices 110 is connected to one of the first controlling line 10 or the second controlling line 20; each controlling end of the even-group switching devices 120 is connected to another of the first controlling line 10 or the second controlling line 20. Each output end of the odd-group switching devices 110 is connected to one of the first binding detection line 30 or the second binding detection line 40; each output end of the even-group switching devices 120 is connected to another of the first binding detection line 30 or the second binding detection line 40. And the odd-group switching devices 110 and the even-group switching devices 120 are turned on alternately in a time-division manner.

It should be noted that the corresponding driving signals are sequentially transmitted in a time-division manner along the first direction DR1, for example, a first output pin to an Nth output pin along the first direction DR1 from left to right output a first driving signal to an Nth driving signal in sequence, respectively. Wherein the first driving signal to the Nth driving signal have a same frequency, however, a phase of the first driving signal to a phase of the Nth driving signal change sequentially; for example, pulse duration of the second driving signal starts when pulse duration of the first driving signal ends or after ending, and phases of other driving signals can be deduced in sequence. It can be understood that this helps to determine a binding state of a corresponding output pin according to a binding detection signal output by the cell test circuit 100 at a corresponding time.

In the embodiment, the N pins are arranged along the first direction DR1 in sequence, such as the first output pin S1, a second output pin S2, a third output pin S3, a fourth output pin S4, a fifth output pin S5, a sixth output pin S6, a seventh output pin S7, an eighth output pin S8, . . . , a (2N−3)th output pin S2N−3, a (2N−2)th output pin S2N−2, a (2N−1)th output pin S2N−1, and a 2Nth output pin S2N . . . etc. The N pads are arranged along the first direction DR1, such as the first pad PAD1, a second pad PAD2, a third pad PAD3, a fourth pad PAD4, . . . , a (2N−3)th pad PAD2N−3, a (2N−2)th pad PAD2N−2, a (2N−1) pad PAD2N−1, and a 2Nth pad PAD2, . . . etc. This way, corresponding calibration of the N pins and the N pads is realized, which helps to identify the corresponding output pins more accurately through timing.

Wherein, if the cell test circuit 100 includes 2N switching devices arranged along the first direction in sequence, the odd-group switching devices 110 can be a collection of a first switching device T1, a third switching device T3, . . . , a (2N−3)th switching device T2N−3, a (2N−1)th switching device T2N−1, and the like, along the first direction DR1 from left to right. The even-group switching devices 120 can be a collection of a second switching device T2, a fourth switching device T4, . . . , a (2N−2)th switching device T2N−2, a 2Nth switching device T2N, and the like, along the first direction DR1 from left to right.

Figure 2:
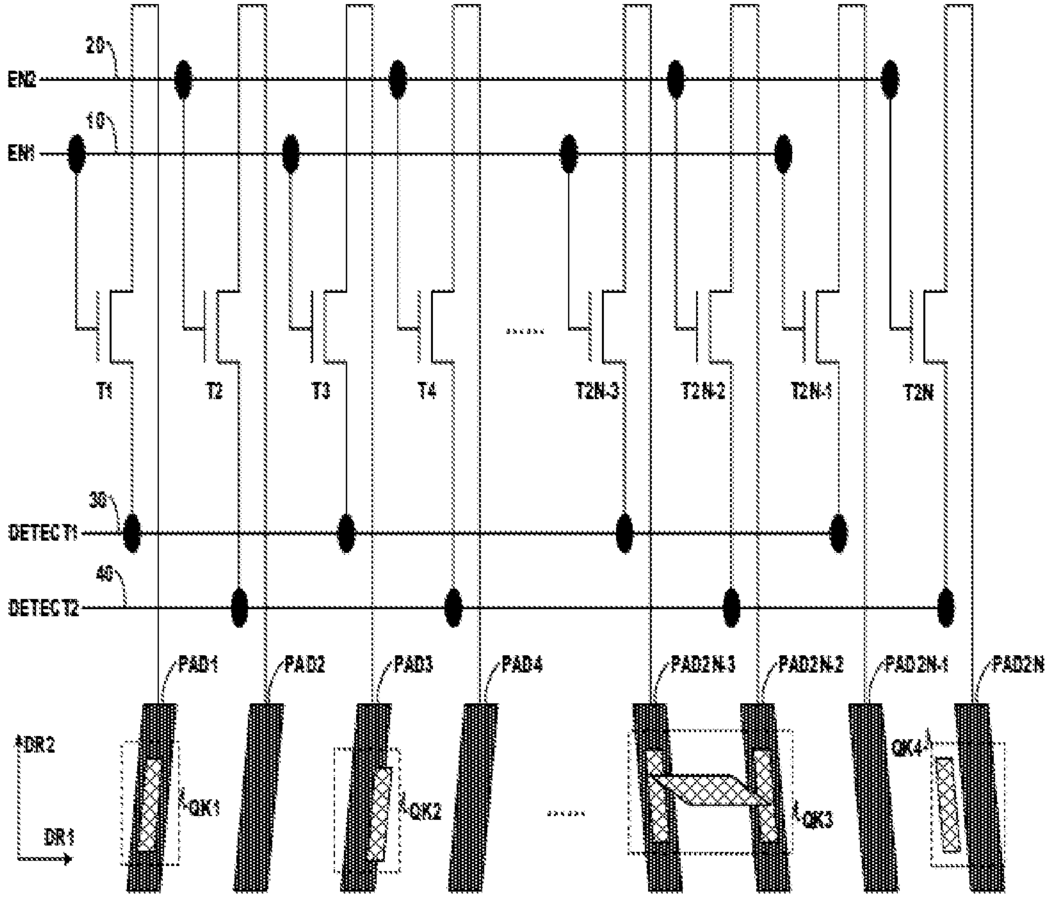
FIG. 2 is a schematic diagram of different binding states provided by an embodiment of the present application.

In one of the embodiments, as shown in FIG. 2, the binding state includes a normal binding state, a bad binding state, a short-circuit binding state, and an unbound state. Wherein the normal binding state is QK1 as shown in FIG. 2, the pins shown in a white pattern and the pads shown in a black pattern completely overlap in a thickness direction of the display panel. The bad binding state is QK2 as shown in FIG. 2, the pins shown in a white pattern and the pads shown in a black pattern partially overlap in the thickness direction of the display panel. The short-circuit binding state is QK3 as shown in FIG. 2, although the pins shown in a white pattern and the pads shown in a corresponding black pattern are completely overlapped respectively in the thickness direction of the display panel; however, due to electrical connection between the pins shown in two adjacent white patterns, two adjacent pins are short-circuited. The unbound state is QK4 as shown in FIG. 2, the pins shown in a white pattern and the pads shown in a black pattern do not overlap at all in the thickness direction of the display panel.

Figure 3:
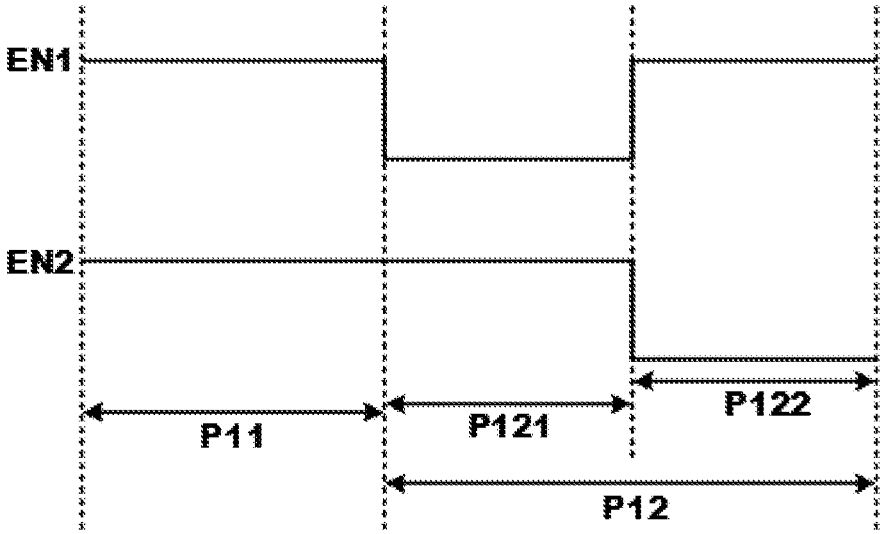
FIG. 3 is a schematic timing diagram of an enable signal provided by an embodiment of the present application.

In one of the embodiments, as shown in FIG. 3, the first controlling line 10 is used to transmit a first enabling signal EN1; the second controlling line 20 is used to transmit a second enabling signal EN2. In a display stage P11 of the display panel, both the first enabling signal EN1 and the second enabling signal EN2 are at high potential; at this time, each switching device of the cell test circuit 100 is in an off state. It can be understood that in the display stage P11, the display panel is in a display state.

In a first binding state detecting sub-stage P121 of a binding state detecting stage P12, the first enabling signal EN1 is at a low potential, and the second enabling signal EN2 is at a high potential. At this time, each switching device in the odd-group switching devices 110 is in an on state, and each switch device in the even-group switch devices 120 is in an off state. In a second binding state detecting sub-stage P122 of the binding state detecting stage P12, the first enabling signal EN1 is at the high potential, and the second enabling signal EN2 is at the low potential. At this time, each switching device in the odd-group switching devices 110 is in the off state, and each switch device in the even-group switch devices 120 is in the on state.

It should be noted that a timing diagram shown in FIG. 3 is illustrated by taking the switching devices in the cell test circuit 100 as P-channel thin film transistors. It can be understood that other embodiments are not limited to this, and N-channel thin film transistors can also be used, and P-channel thin film transistors and/or N-channel thin film transistors can also be used. Timing of a required first enabling signal EN1 and a required second enabling signal EN2 can be adjusted according to an inventive concept of a corresponding embodiment, which will not be repeated here.

In one of the embodiments, as shown in FIGS. 4 to 7, the binding detection signals include a first binding detection signal DETECT1 transmitted by the first binding detection line 30 and a second binding detection signal DETECT2 transmitted by the second binding detection line 40.

Figure 4:
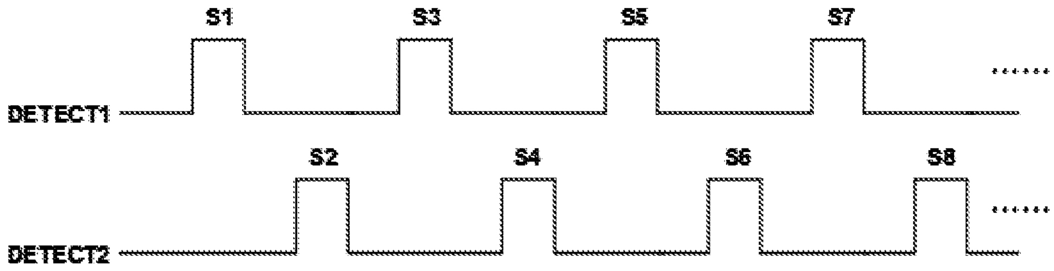
FIG. 4 is a schematic timing diagram of a signal to be tested provided by an embodiment of the present application in a normal binding state.

In one of the embodiments, a position of a corresponding pin is determined according to a timing comparison result of each driving signal to each binding detection signal. For example, as shown in FIG. 4, the first output pin S1 to the eighth output pin S8 output a driving signal including one pulse in sequence in a time-division manner. Correspondingly, corresponding waveforms of the first binding detection signal DETECT1 and the second binding detection signal DETECT2 shown in FIG. 4 can be obtained by simultaneously monitoring the first binding detection signal DETECT1 and the second binding detection signal DETECT2; and then, it can be determined according to the above-mentioned corresponding hardware connection relationship: a first pulse of the first binding detection signal DETECT1 is derived from the first output pin S1; a first pulse of the second binding detection signal DETECT2 is derived from the second output pin S2; a second pulse of the first binding detection signal DETECT1 is derived from the third output pin S3; a second pulse of the second binding detection signal DETECT2 is derived from the fourth output pin S4; a third pulse of the first binding detection signal DETECT1 is derived from the fifth output pin S5; a third pulse of the second binding detection signal DETECT2 is derived from the sixth output pin S6; a fourth pulse of the first binding detection signal DETECT1 is derived from the seventh output pin S7; a fourth pulse of the second binding detection signal DETECT2 is derived from the eighth output pin S8, . . . , and others can be deduced in sequence.

In one of the embodiments, as shown in FIG. 4, a pulse of the Nth driving signal and a pulse of the Nth binding detection signal are in a same time period, then it is determined that a pin corresponding to the Nth binding detection signal is the Nth pin.

For example, a pulse of the first driving signal output by the first output pin S1 and a pulse of the first binding detection signal, that is, the first pulse of the first binding detection signal DETECT1, are located in a same period, then it is determined that a pin corresponding to the first pulse of the first binding detection signal DETECT1 is the first pin or the first output pin S1.

In one of the embodiments, a binding state between a corresponding pin and a corresponding pad is determined according to a state comparison result and/or the timing comparison result of each driving signal and each binding detection signal.

In one of the embodiments, as shown in FIG. 4, in response to timing and pulse amplitude of each driving signal being consistent with timing and pulse amplitude of each binding detection signal, the binding state between the corresponding pin and the corresponding pad is then determined to be the normal binding state.

For example, a pulse of the first driving signal output by the first output pin S1 and a pulse of the first binding detection signal, that is, the first pulse of the first binding detection signal DETECT1, are located in a same time period, that is, timing of the two are consistent with each other. At a same time, amplitude of the first pulse of the first binding detection signal DETECT1 is approximately equal to or equal to amplitude of the pulse of the first driving signal output by the first output pin S1, it is then determined that a binding state between the first output pin S1 and the first pad PAD1 is the normal binding state, and others can be deduced in sequence.

Figure 5:
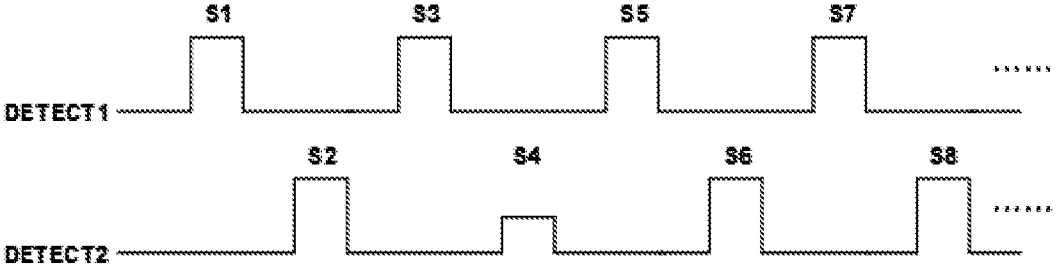
FIG. 5 is a schematic timing diagram of a signal to be tested provided by an embodiment of the present application in a bad binding state.

In one of the embodiments, as shown in FIG. 5, in response to pulse amplitude of each binding detection signal being less than pulse amplitude of a corresponding driving signal, the pin corresponding to the binding detection signal is then determined to be in the bad binding state.

For example, amplitude of the second pulse of the second binding detection signal DETECT2 is obviously less than amplitude of a pulse of a fourth driving signal output by the fourth output pin S4, based on this, it can be determined that the fourth output pin S4 corresponding to the second pulse of the second binding detection signal DETECT2 is in the bad binding state.

Figure 6:
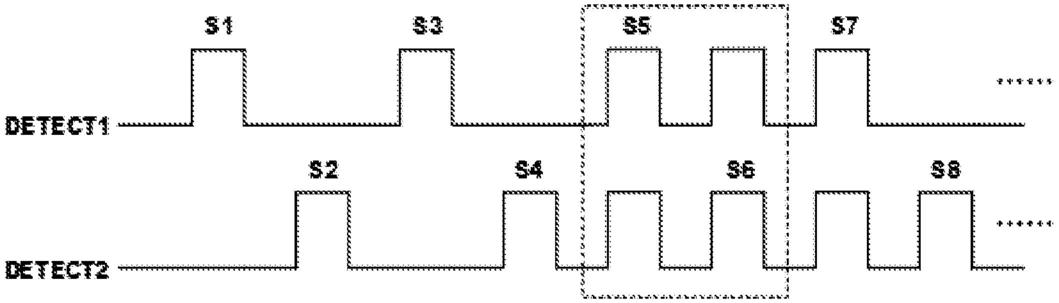
FIG. 6 is a schematic timing diagram of a signal to be tested provided by an embodiment of the present application in a short-circuit binding state.

In one of the embodiments, as shown in FIG. 6, in response to pulse duration of the first binding detection signal overlapping in timing with pulse duration of the second binding detection signal, at least two adjacent corresponding pins are then determined to be in the short-circuit binding state.

For example, when the fifth output pin S5 outputs a fifth driving signal, correspondingly, the first binding detection signal DETECT1 should receive the third pulse, while the second binding detection signal DETECT2 should not receive the third pulse at this time; similarly, when the sixth output pin S6 outputs a sixth driving signal, correspondingly, the second binding detection signal DETECT2 should receive the third pulse, while the first binding detection signal DETECT1 should not receive the fourth pulse at this time. However, since both the first binding detection signal DETECT1 and the second binding detection signal DETECT2 receive pulses at a same time, it can be concluded that the short-circuit binding state exists between the fifth output pin S5 and the sixth output pin S6.

Figure 7:
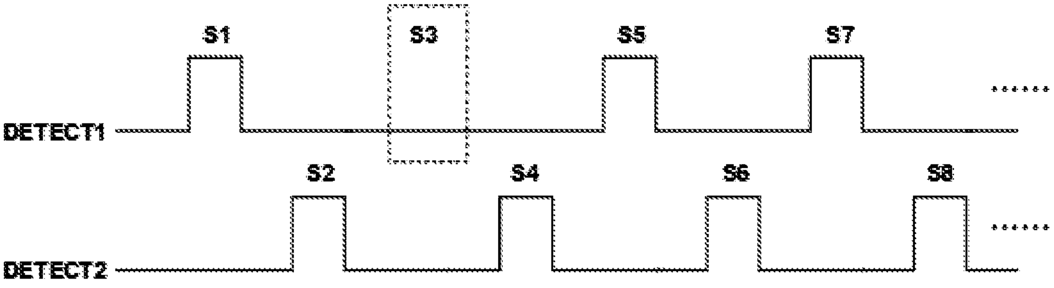
FIG. 7 is a schematic timing diagram of a signal to be tested provided by an embodiment of the present application in an unbound state.

In one of the embodiments, as shown in FIG. 7, in response to a number of pulses of the binding detection signal being less than a number of pulses of each driving signal, and then the corresponding pin is determined to be in the unbound state.

For example, in the normal binding state, when the third output pin S3 outputs a third driving signal, the first binding detection signal DETECT1 should receive the second pulse; however, since the third output pin S3 is not bound to the third pad PAD3, the first binding detection signal DETECT1 does not receive the second pulse, so it can be determined that the third output pin S3 is in the unbound state.

In one of the embodiments, a display device is provided by the embodiment. The display device includes the display panel in one above-mentioned embodiment at least. Wherein the driving chip set 300, the pad set 200, and the cell test circuit 100 are arranged along a second direction DR2 in sequence.

It can be understood that the display device provided by the embodiment, through one of the pads being bound in correspondence with one of the pins, each input end of the cell test circuit 100 is connected corresponding to one of the pads, respectively. The first controlling end of the cell test circuit 100 is connected to the first controlling line 10; the second controlling end of the cell test circuit 100 is connected to the second controlling line 20; the first output end of the cell test circuit 100 is connected to the first binding detection line 30; the second output end of the cell test circuit 100 is connected to the second binding detection line 40. The cell test circuit 100 can determine the binding state between each pin and the corresponding pad according to the timing and the states of the binding detection signals output in correspondence with the first binding detection line 30 and the second binding detection line 40, which not only can detect the binding state of each pin, but also improve detection accuracy of the binding state; and the binding state between each pin and the corresponding pad can be determined according to the timing and states of the binding detection signals; compared with relying on the microscope to check the binding state of each pin one by one, detection efficiency of binding state is improved.

In addition, the display panel in related art usually uses the cell test circuit 100 for lighting test. The present application can endow the cell test circuit 100 with a new purpose or function, which not only saves circuit usage of the display panel, but also implements more advanced detection of the binding state.

It should be noted that the above-mentioned display panel can be any one of an organic light-emitting diode (LED) display panel, a liquid crystal display panel, a micro LED display panel, a mini LED display panel, and a quantum dot LED display panel, but is not limited here.

It can be understood that for those of ordinary skill in the art, equivalent replacements or changes can be made according to technical solutions of the present application and the inventive concept thereof, and all these changes or replacements should belong to a protective scope of appended claims of the present application.

What is claimed is:

1. A display panel, comprising:

a driving chip set, the driving chip set comprising N pins used to transmit corresponding driving signals, N is a positive integer;

a pad set, the pad set comprising N pads, one of the pads is bound in correspondence with one of the pins; and a cell test circuit, each input end of the cell test circuit is connected corresponding to one of the pads respectively, a first controlling end of the cell test circuit is connected to a first controlling line, a second controlling end of the cell test circuit is connected to a second controlling line, a first output end of the cell test circuit is connected to a first binding detection line, a second output end of the cell test circuit is connected to a second binding detection line, a binding state between each pin and a corresponding pad is determined according to timing and states of binding detection signals output in correspondence with the first binding detection line and the second binding detection line.

2. The display panel as claimed in claim 1, wherein the N pins are sequentially arranged along a first direction, and the corresponding driving signals are sequentially transmitted along the first direction in a time-division manner by the N pins;

the N pads are sequentially arranged along the first direction, wherein a first pad to an Nth pad are bound in correspondence with a first pin to an Nth pin in sequence;

the cell test circuit comprises N switching devices arranged along the first direction in sequence, the N switching devices are divided into odd-group switching devices and even-group switching devices, wherein an input end of a first switching device to an input end of an Nth switching device are connected corresponding to the first pad to the Nth pad in sequence, respectively; each controlling end of the odd-group switching devices is connected to one of the first controlling line or the second controlling line, each controlling end of the even-group switching devices is connected to another of the first controlling line or the second controlling line; each output end of the odd-group switching devices is connected to one of the first binding detection line or the second binding detection line, each output end of the even-group switching devices is connected to another of the first binding detection line or the second binding detection line; and the odd-group switching devices and the even-group switching devices are turned on alternately in a time-division manner.

3. The display panel as claimed in claim 2, wherein a position of a corresponding pin is determined according to a timing comparison result of each driving signal to each binding detection signal;

a binding state between the corresponding pin and a corresponding pad is determined according to a state comparison result and/or the timing comparison result of each driving signal and each binding detection signal.

4. The display panel as claimed in claim 3, wherein a pulse of an Nth driving signal and a pulse of an Nth binding detection signal are in a same time period, and then a pin corresponding to the Nth binding detection signal is determined to be the Nth pin.

5. The display panel as claimed in claim 3, wherein the binding state comprises a normal binding state, and in response to timing and pulse amplitude of each driving signal being consistent with timing and pulse amplitude of each binding detection signal, then the binding state between the corresponding pin and the corresponding pad is determined to be the normal binding state.

6. The display panel as claimed in claim 3, wherein the binding state further comprises a bad binding state, and in response to pulse amplitude of each binding detection signal being less than pulse amplitude of a corresponding driving signal, then the pin corresponding to the binding detection signal is determined to be in the bad binding state.

7. The display panel as claimed in claim 3, wherein the binding state further comprises a short-circuit binding state, the binding detection signal comprises a first binding detection signal transmitted by the first binding detection line and a second binding detection signal transmitted by the second binding detection line, in response to pulse duration of the first binding detection signal overlapping in timing with pulse duration of the second binding detection signal, then at least two adjacent corresponding pins are determined to be in the short-circuit binding state.

8. The display panel as claimed in claim 3, wherein the binding state further comprises an unbound state, in response to a number of pulses of the binding detection signal being less than a number of pulses of each driving signal, then the corresponding pin is determined to be in the unbound state.

9. A display device, comprising the display panel as claimed in claim 1, wherein the driving chip set, the pad set, and the cell test circuit are arranged along a second direction in sequence.

10. The display device as claimed in claim 9, wherein the N pins are sequentially arranged along a first direction, and the corresponding driving signals are sequentially transmitted along the first direction in a time-division manner by the N pins;

the N pads are sequentially arranged along the first direction, wherein a first pad to an Nth pad are bound in correspondence with a first pin to an Nth pin in sequence;

the cell test circuit comprises N switching devices arranged along the first direction in sequence, the N switching devices are divided into odd-group switching devices and even-group switching devices, wherein an input end of a first switching device to an input end of an Nth switching device are connected corresponding to the first pad to the Nth pad in sequence, respectively; each controlling end of the odd-group switching devices is connected to one of the first controlling line or the second controlling line, each controlling end of the even-group switching devices is connected to another of the first controlling line or the second controlling line; each output end of the odd-group switching devices is connected to one of the first binding detection line or the second binding detection line, each output end of the even-group switching devices is connected to another of the first binding detection line or the second binding detection line; and the odd-group switching devices and the even-group switching devices are turned on alternately in a time-division manner.

11. The display device as claimed in claim 10, wherein a position of a corresponding pin is determined according to a timing comparison result of each driving signal to each binding detection signal;

a binding state between the corresponding pin and a corresponding pad is determined according to a state comparison result and/or the timing comparison result of each driving signal and each binding detection signal.

12. The display device as claimed in claim 11, wherein a pulse of an Nth driving signal and a pulse of an Nth binding detection signal are in a same time period, and then a pin corresponding to the Nth binding detection signal is determined to be the Nth pin.

13. The display device as claimed in claim 11, wherein the binding state comprises a normal binding state, and in response to timing and pulse amplitude of each driving signal being consistent with timing and pulse amplitude of each binding detection signal, then the binding state between the corresponding pin and the corresponding pad is determined to be the normal binding state.

14. The display device as claimed in claim 11, wherein the binding state further comprises a bad binding state, and in response to pulse amplitude of each binding detection signal being less than pulse amplitude of a corresponding driving signal, then the pin corresponding to the binding detection signal is determined to be in the bad binding state.

15. The display device as claimed in claim 11, wherein the binding state further comprises a short-circuit binding state, the binding detection signal comprises a first binding detection signal transmitted by the first binding detection line and a second binding detection signal transmitted by the second binding detection line, in response to pulse duration of the first binding detection signal overlapping in timing with pulse duration of the second binding detection signal, then at least two adjacent corresponding pins are determined to be in the short-circuit binding state.

16. The display device as claimed in claim 11, wherein the binding state further comprises an unbound state, in response to a number of pulses of the binding detection signal being less than a number of pulses of each driving signal, then the corresponding pin is determined to be in the unbound state.

17. The display device as claimed in claim 10, wherein the first direction is different from the second direction.

18. The display device as claimed in claim 10, wherein the switching devices are thin film transistors.

19. The display panel as claimed in claim 2, wherein the input end of the first switching device to the input end of the Nth switching device are sources of respective switching devices, which each is in turn connected to respective one of the N pads bound in correspondence with the first pin to the Nth pin; and each controlling end of the switching devices is gates of the switching devices, which each is in turn connected to the first binding detection line or the second binding detection line.

20. The display device as claimed in claim 10, wherein the input end of the first switching device to the input end of the Nth switching device are sources of respective switching devices, which each is in turn connected to respective one of the N pads bound in correspondence with the first pin to the Nth pin; and each controlling end of the switching devices is gates of the switching devices, which each is in turn connected to the first binding detection line or the second binding detection line.

* * * * *